United States Patent
Peterson et al.

(10) Patent No.: US 10,489,289 B1
(45) Date of Patent: Nov. 26, 2019

(54) PHYSICAL MEDIA AWARE SPACIALLY COUPLED JOURNALING AND TRIM

(71) Applicant: Amazon Technologies, Inc., Reno, NV (US)

(72) Inventors: Phillip Peterson, Seattle, WA (US); Leonid Baryudin, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 204 days.

(21) Appl. No.: 15/282,310

(22) Filed: Sep. 30, 2016

(51) Int. Cl.
*G06F 12/02* (2006.01)
*G06F 3/06* (2006.01)

(52) U.S. Cl.
CPC .......... *G06F 12/0246* (2013.01); *G06F 3/061* (2013.01); *G06F 3/0616* (2013.01); *G06F 3/0659* (2013.01); *G06F 3/0665* (2013.01); *G06F 3/0679* (2013.01)

(58) Field of Classification Search
CPC ...... G06F 3/061; G06F 3/0616; G06F 3/0665; G06F 3/0659; G06F 3/0679
USPC .................................................. 711/170, 203
See application file for complete search history.

(56) References Cited

U.S. PATENT DOCUMENTS

| | | | | |
|---|---|---|---|---|
| 8,793,429 B1 * | 7/2014 | Call | .................... | G06F 12/0246 711/103 |
| 9,323,667 B2 * | 4/2016 | Bennett | ............... | G06F 12/0292 |
| 9,489,296 B1 | 11/2016 | Tomlin | | |
| 9,817,576 B2 * | 11/2017 | Hayes | ................... | G06F 3/0607 |
| 2003/0163594 A1 | 8/2003 | Aasheim et al. | | |
| 2009/0150599 A1 | 6/2009 | Bennet | | |
| 2009/0282301 A1 | 11/2009 | Flynn | | |
| 2010/0070735 A1 | 3/2010 | Chen et al. | | |
| 2011/0060864 A1 | 3/2011 | Yoshii et al. | | |
| 2012/0297258 A1 | 11/2012 | Flynn et al. | | |
| 2012/0303866 A1 * | 11/2012 | Bandic | ................... | G11B 5/012 711/103 |
| 2014/0101369 A1 | 4/2014 | Tomlin et al. | | |
| 2014/0136768 A1 * | 5/2014 | Iglesia | .................... | G06F 3/061 711/103 |
| 2014/0195725 A1 | 7/2014 | Bennett | | |
| 2014/0325117 A1 | 10/2014 | Canepa et al. | | |

(Continued)

OTHER PUBLICATIONS

International Search Report and Written Opinion issued in related Application No. PCT/US2017/053763 dated Dec. 20, 2017.

(Continued)

*Primary Examiner* — Pierre Miche Bataille
(74) *Attorney, Agent, or Firm* — Hogan Lovells US LLP

(57) ABSTRACT

An indirection mapping data structure can maintain a mapping between logical block addresses used by a host computer and physical data storage locations on an SSD. The indirection mapping data structure can include a existence map as well as a user data map. Trim data may be received from a host computer or other entity and may be used to mark particular logical addresses that are not in use as trimmed. To ensure trim data persists even if the indirection mapping data structure is lost, the existence map may be regularly stored to disk. The existence map can be journaled in the same way as user data stored to disk. When the indirection mapping data structure is rebuilt, the spatially coupled journals can be retrieved from the predefined scattered locations and used to identify the stored trim data which can be used to rebuild the existence map.

20 Claims, 10 Drawing Sheets

(56) References Cited

U.S. PATENT DOCUMENTS

| | | | |
|---|---|---|---|
| 2015/0178164 A1* | 6/2015 | Zhang | G06F 11/1435 |
| | | | 714/20 |
| 2017/0160987 A1* | 6/2017 | Royer, Jr. | G06F 3/0659 |
| 2017/0269992 A1 | 9/2017 | Bandic | |
| 2018/0074708 A1* | 3/2018 | Gerhart | G06F 3/064 |
| 2018/0095680 A1* | 4/2018 | Peterson | G06F 3/0643 |

OTHER PUBLICATIONS

Non-Final Office Action issued in corresponding U.S. Appl. No. 15/282,295 dated Jun. 11, 2018.

Non-Final Office Action issued in corresponding U.S. Appl. No. 15/393,033 dated Apr. 30, 2018.

* cited by examiner

Figure 3:
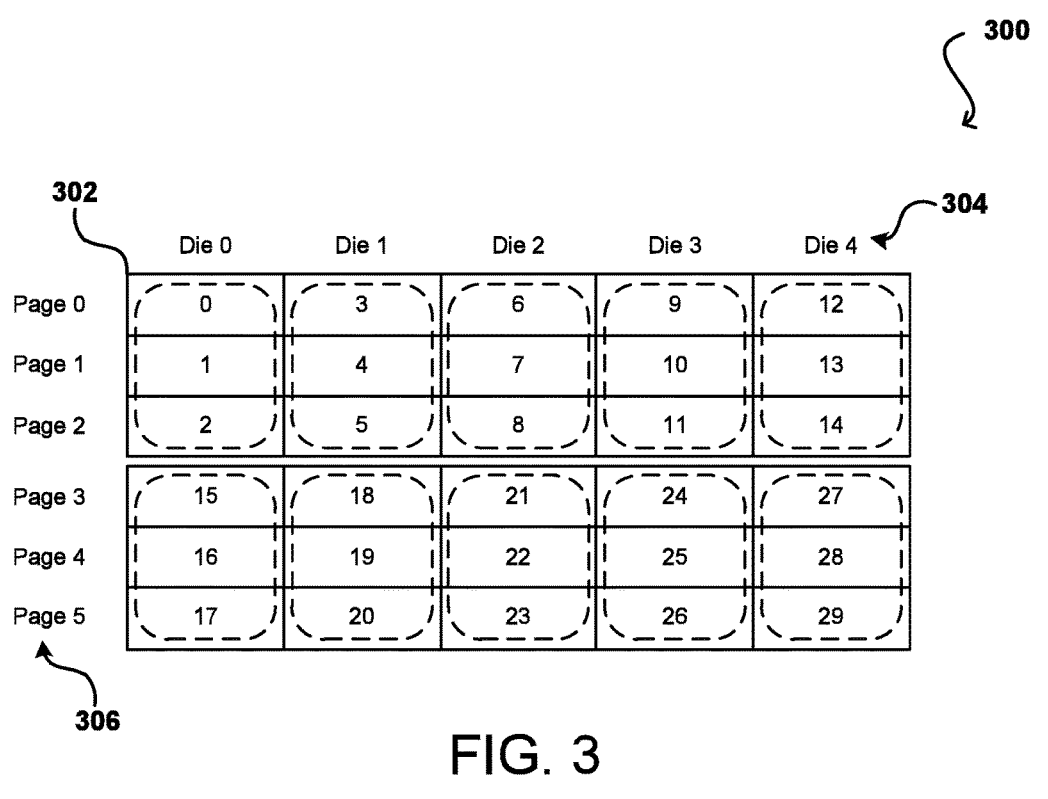

| | Die 0 | Die 1 | Die 2 | Die 3 | Die 4 |
|---|---|---|---|---|---|
| Page 0 | 0 | 3 | 6 | 9 | 12 |
| Page 1 | 1 | 4 | 7 | 10 | 13 |
| Page 2 | 2 | 5 | 8 | 11 | 14 |
| Page 3 | 15 | 18 | 21 | 24 | 27 |
| Page 4 | 16 | 19 | 22 | 25 | 28 |
| Page 5 | 17 | 20 | 23 | 26 | 29 |

PHYSICAL MEDIA AWARE SPACIALLY COUPLED JOURNALING AND TRIM

BACKGROUND

Virtualized computing environments are frequently supported by block-based storage. Such block-based storage is increasingly provided by solid state drives (SSDs). SSDs provide a block-style interface, making it easy to integrate these drives into systems that have traditionally relied on hard drives and other block storage devices. SSD drive manufacturers incorporate a controller which provides the block-style interface and which manages data storage and mapping. For example when a read or write request is received, it may include a logical block address associated with the request. The controller may determine a physical location on the SSD from where the data should be read, or to where the data should be written. The controller may also manage data storage on the SSD to improve the longevity of the device and manage other flash-specific functions. However, while the drive manufacturer may provide a controller that is suitable for the average customer, such controllers may not provide sufficient flexibility or customizability for all users and applications for which such drives may be deployed.

BRIEF DESCRIPTION OF THE DRAWINGS

Various embodiments in accordance with the present disclosure will be described with reference to the drawings, in which:

FIG. 3 illustrates a diagram of a flash array in accordance with various embodiments.

DETAILED DESCRIPTION

Systems and methods in accordance with various embodiments of the present disclosure overcome one or more of the aforementioned and other deficiencies experienced in conventional approaches to managing solid state drives (SSDs) in a block-based storage service in an electronic environment. In particular, SSD management features may be decoupled from a built in SSD controller and implemented in an external controller. The SSD management features may include indirection mapping and trim. An indirection mapping data structure can maintain a mapping between logical block addresses used by a host computer and physical data storage locations on an SSD. Updates to the indirection mapping data structure can be stored in journals. The indirection mapping data structure can include an existence map as well as a user data map. Trim requests may be received from a host computer or other entity and may be used to mark particular logical addresses that are not in use as trimmed. The existence map can include trim data, which indicates that corresponding logical addresses have been trimmed. To ensure trim data persists even if the indirection mapping data structure is lost, the existence map portion of the indirection map may be regularly stored to media. The existence map can be journaled in the same way as user data stored to the media. When the indirection mapping data structure is rebuilt, the spatially coupled journals can be retrieved from the predefined scattered locations and used to identify the stored trim data which can be used to rebuild the existence map.

Figure 1:
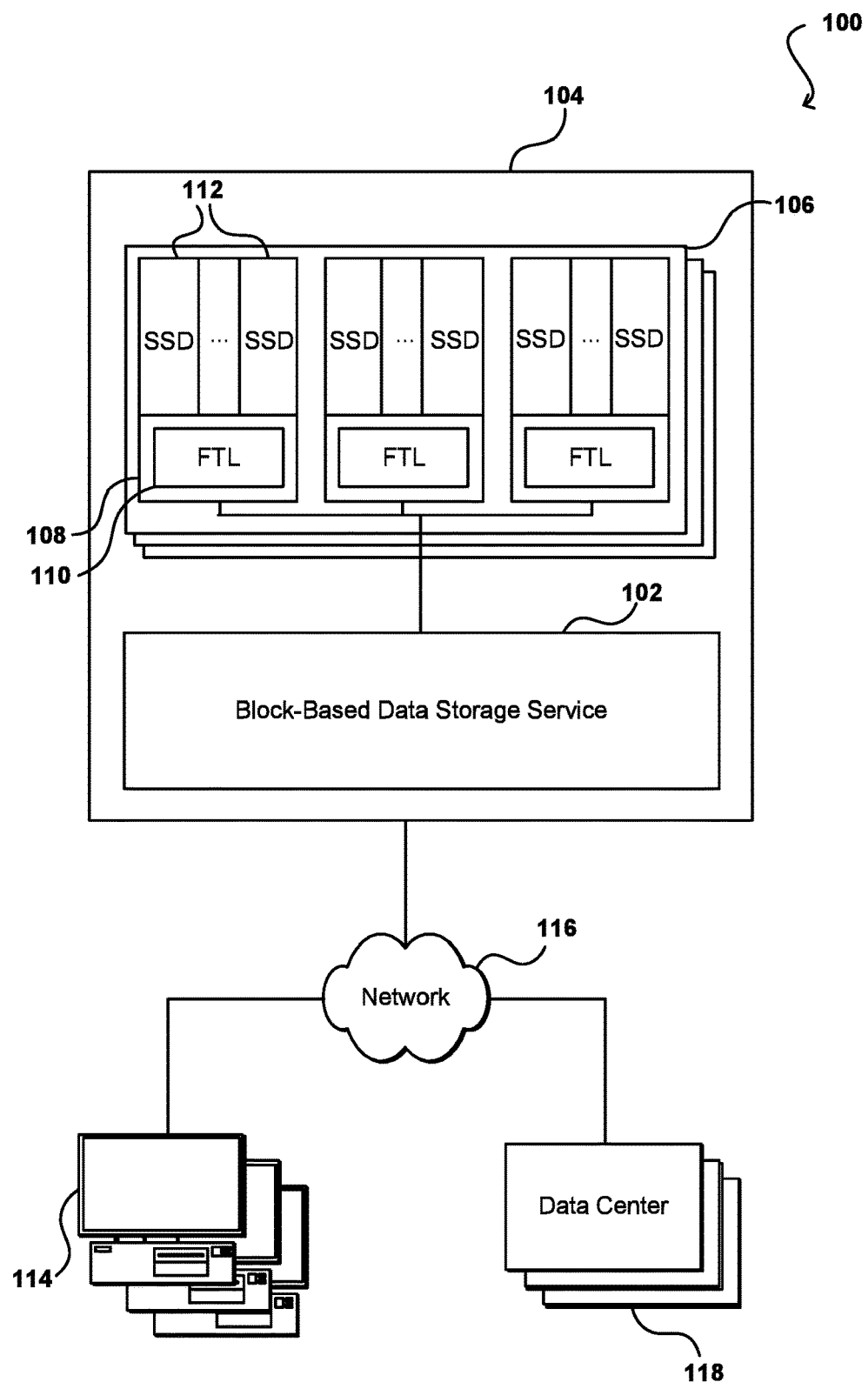
FIG. 1 illustrates an example environment in which aspects of various embodiments can be implemented.

FIG. 1 illustrates an example environment 100 in which aspects of various embodiments can be implemented. In this example configuration, a block-based data storage service 102 uses multiple block-based data storage systems in a data center 104 to provide reliable, non-local, block-based data storage to executing programs or various other components, systems, or services. Data center 102 includes a number of racks 104, each rack including a number of computing systems 106. The computing systems 106 on the illustrated rack 104 each can include a controller 108, including a flash translation layer (FTL) and one or more solid state drives (SSD) 110. Solid state drives typically include a controller that performs various management functions. However, in various embodiments, these functions are decoupled from the drive itself and provided by external controller 108. For example the flash translation layer of controller 108 may provide journaling, replay, and other indirection mapping management services, as discussed further below.

As shown in FIG. 1, a block-based data storage service 112 can provision block storage devices for one or more host computing systems 114, virtual machines, and/or other services. In some embodiments, block storage devices may be accessed over a network 116, including a local network and/or an external network (e.g., the Internet or another public data network). In some embodiments, the data center 104 can be connected via the network 116 to one or more other data centers 118 that each may include some or all of the computing systems and storage systems illustrated with respect to data center 104. The host computing systems 114 may be operated by various parties for various purposes, such as by the operator of the data center or third parties (e.g., customers of the block-based data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center.

It will be appreciated that the example of FIG. 1 has been simplified for the purposes of explanation, and that the number and organization of host computing systems, server block data storage systems and other devices may be much larger than what is depicted in FIG. 1. For example, as one illustrative embodiment, there may be thousands of computing systems per data center, with at least some of those computing systems being host computing systems that may each host one or more virtual machines, and/or with some of those computing systems being block-based data storage systems that may each store several volume copies. If each hosted virtual machine executes one program, then such a data center may execute as many as tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

In various embodiments, the block-based storage service can expose the storage to the customers as a Web service. Customers can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects.

Traditional solid state drives (SSDs) include a controller that provides various drive and data management features. For example, SSDs store data persistently in flash cells; however data cannot be overwritten and instead must be first erased before new data can be stored. Additionally, each cell has a finite number of write/erase cycles before it can no longer reliably store data. As such, to effectively manage data storage, SSD-specific garbage collection, replay, and trim methods may be implemented by the SSD controller. As discussed above, these features are provided by drive manufacturers and may not be suitable for all users. Many of the features provided by the controller can be decoupled from the SSD in accordance with various embodiments.

Figure 2:
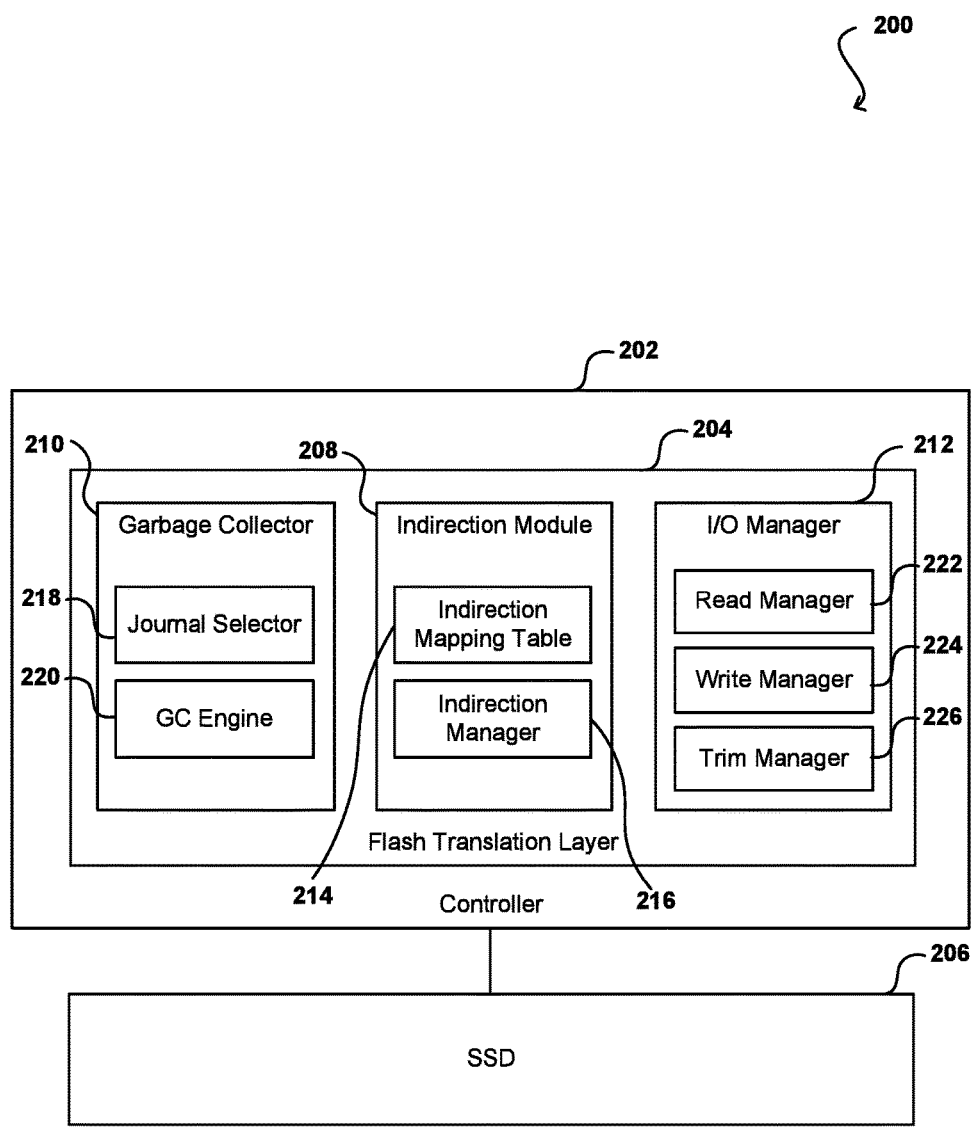
FIG. 2 illustrates block diagram of a flash translation layer for a solid state drive that can be utilized in accordance with various embodiments.

FIG. 2 illustrates block diagram 200 of a controller decoupled from a solid state drive that can be utilized in accordance with various embodiments. Controller 202 can include a flash translation layer (FTL) 204 which provides various data management features for a SSD 206. As shown in FIG. 2, FTL 204 can include indirection module 208, a garbage collector 210, and input/output manager 212. Many of these management features require locating where data is stored physically on the SSD. Indirection module 208 can manage these locations using an indirection mapping table 214 that maps logical block addresses which are used by a host computing system to the physical data locations on disk. These logical-to-physical mappings are described in indirection units stored in the indirection mapping table. An indirection manager 216 can enable indirection units in the indirection mapping table to be stored, modified, or updated. The indirection mapping table can be implemented as various data structures as would be known to one of ordinary skill in the art. In various embodiments, each indirection entry may represent multiple logically and contiguous data blocks.

Such indirection mapping tables can become quite large, increasing in size in proportion to the size of the SSD. The indirection mapping table may be maintained in volatile memory, such as RAM. This provides quick access to the mappings, but results in potential loss of the indirection mapping table in the event of a power failure or other unexpected power interruption. In various embodiments, and as discussed further below, a spatially coupled journaling scheme is implemented in which each time data is written to disk, a journal entry including logical address information. Based on the location of the journal entry, the corresponding physical location can be inferred. Each journal has a finite size, storing a maximum number of corresponding entries. In some embodiments all journals are of the same size. In some embodiments journals can be of variable size. Additionally, each physical chunk of media, whether defective or not, is journaled. By including a journal entry for every physical chunk of media, the journals can be stored at predetermined locations, regardless of the locations of defective blocks (e.g., bad blocks) on the disk. When the journal has reached a predefined limit, the journal is stored to the SSD within the same cluster block and immediately after the data it describes. As the journal includes a finite number of entries, corresponding to a known amount of disk space, the location of the journal on disk, relative to the start of a cluster block (or the last journal storage location) is known deterministically.

As discussed, a flash block must be in an erased state before data can be stored to it (e.g., data cannot be overwritten to the same physical location unless it is first erased). To accommodate these characteristics, data can be written sequentially to the next available page. When new data is written and associated with the same logical address as previously written data, the previously written data is invalidated. Garbage collector 210 can ensure erased cluster blocks are available to store data, and to reduce data fragmentation. Garbage collector 210 can include a journal selector 218 that can retrieve journals from the predetermined locations and determine whether the data is valid. Garbage collection engine 220 can then relocate data as needed or ignore the data, leading to it being erased when the cluster block is erased. Input/output manager 212 can manage read and write access to the SSD 206. In various embodiments, read manager 222 and write manager 224 may include read and write caches that store data requested to be read or written. In various embodiments, a trim manager 226 can enable a client device to indicate a range of logical addresses are stale and can be discarded. By enabling ranges of logical addresses to be marked stale by the client, garbage collection overhead can be reduced.

FIG. 3 illustrates a diagram 300 of a flash array in accordance with various embodiments. Cluster block 302 represents a grouping of contiguous die 304 on an SSD. This grouping may include physical erase blocks across an array of N contiguous die. The grouping of physical erase blocks may include the same block index from each die to simplify translation from logical to physical erase blocks. In embodiments using multi-plane programming on a die, P consecutive blocks from each of the N die can be grouped into a single cluster block, where P is the number of planes supported by the NAND die. When data is stored to disk, it is stored on one or more pages 306 of the cluster block 302. Although the example cluster block 302 shown in FIG. 3 includes five die 302 and six pages 304, alternative configurations may also be used. Additionally, cluster blocks may be variable in length. In this example, each dashed box represents the amount of physical space on the SSD that is written during a write operation. Each number inside each dashed box indicates an ordering in which indirection units are laid out on the cluster block. As data is written to the cluster block, corresponding entries are stored in a journal, with each entry corresponding to an indirection unit in the order shown. This example is continued in FIG. 4.

Figure 4:
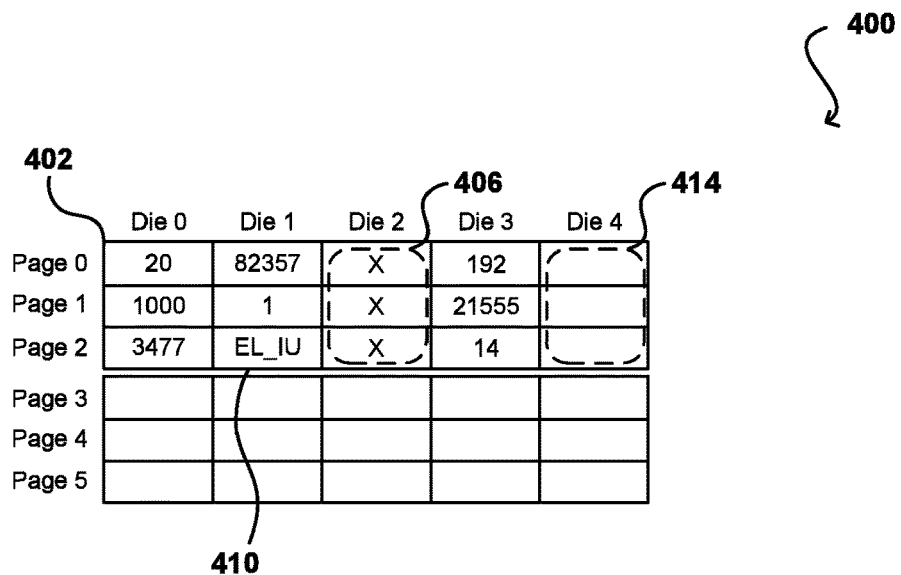
FIG. 4 illustrates a journal and flash array in accordance with various embodiments.
Figure 4:
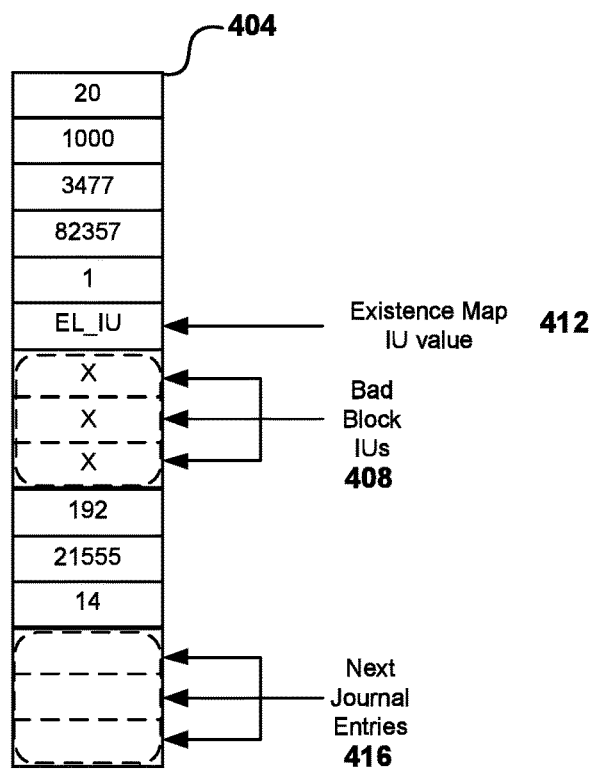

FIG. 4 illustrates a diagram 400 of a journal and flash array in accordance with various embodiments. As shown in FIG. 4, cluster block 402 stores data corresponding to logical block addresses. Journal 404 can be maintained in RAM and include the logical block addresses for data stored in the cluster block. The journal can be updated in the same order as data is written to disk. As shown above with respect to FIG. 3, data is written to disk in a particular order. For example, the first three entries of journal 404 correspond to die 0, pages 0-2, reflecting the order in which the data was written. By updating the journal in the same order, each entry in the journal corresponds to a known location on the disk. The journal includes entries for each physical portion of media, even if that portion is not written to, e.g., including defective or skipped blocks, such that the journal remains synchronized with the data on disk. For example, as shown in FIG. 4, dashed box 406 includes defective blocks indicated as having value X. These defective blocks, also referred to as bad blocks, may be identified using a bad block table, or through detection of an error during writing or during a subsequent read of the defective location. The journal 404 includes entries for every portion of physical disk, including the defective blocks, shown in journal entries 408. As discussed further below, this enables the spatially coupled journals to be used not only to rebuild the indirection map, but also to rebuild a bad block table on demand Additionally, indirection unit 410, shown at die 1, page 2, can be an existence log indirection unit. As discussed, the existence map can be stored to media in one or more indirection units (depending on the size of the existence map and the size of the indirection units). The journal 404 can be updated to include an entry 412 having a value that indicates it is an existence map indirection unit. This value may be an invalid address, flag, or any other data that indicates the corresponding location includes existence map data. As shown in FIG. 4, following defective blocks, the journal 404 may continue to include entries in order, as described above. For example, dashed box 414 indicates the next portion of disk to be written which corresponds to the next three entries 416 of journal 404.

In some embodiments, each journal 404 can be the same size. Once the journal has filled all of its entries, it can be stored to cluster block 402. For example, the size of the journal can be made equal to the size of an indirection unit such that the journal can be written in a single write operation and the next journal can include entries starting with the next indirection unit. Since each journal is stored at a predetermined location, each journal includes entries that map a fixed amount of physical media to logical units. Where these logical units are of fixed size, each journal has a fixed number of journal entries. If the logical units are of variable sizes, e.g., where compression is used, journals are still stored at predetermined locations. To enable the journals to be stored at the predetermined locations, each journal may include a variable number of entries. When entries corresponding to the fixed amount of physical disk space have been journaled, the journal can be closed and stored at the predetermined location. In this example, each journal may include a different number of journal entries, but will be stored at predetermined locations and cover a fixed amount of physical disk space.

Figure 5:
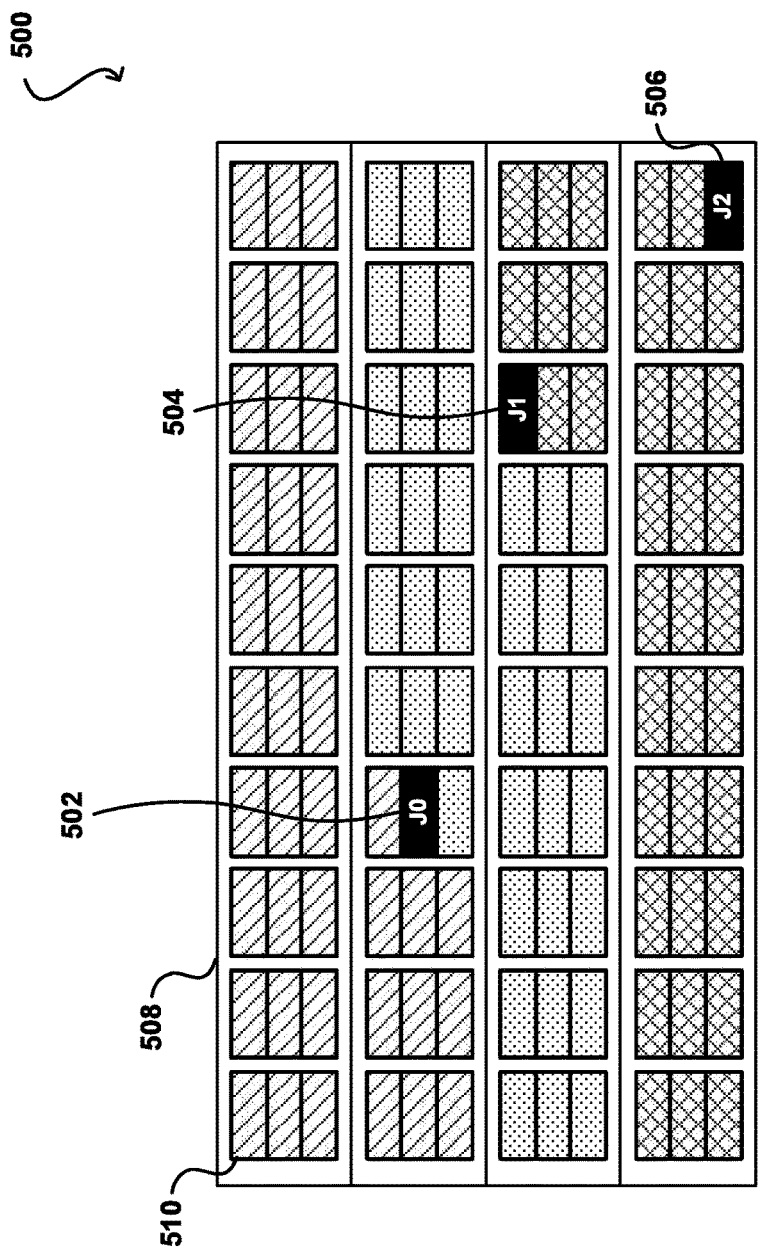
FIG. 5 illustrates spatially coupled journals in accordance with various embodiments.

FIG. 5 illustrates a diagram 500 of spatially coupled journals in accordance with various embodiments. As described above, a journal can be stored to disk in the same cluster block in-line with the data described in the journal. This is referred to as spatially coupled, as the journal and data are co-located. Additionally, because data is stored to disk in a particular order, each physical chunk of media is journaled including bad blocks, and the journals are of finite size, each journal is stored at a physical location on disk that is known deterministically from the start of a cluster block.

In some embodiments, a journal can be stored upon detection of a journal storage event. As discussed, one example of a journal storage event is determining that the journal is full. When the journal is determined to be full, it can be saved to the next physical location on the cluster block. As shown in FIG. 5, multiple journals 502, 504, 506 can be spatially coupled to cluster block 508, each journal including indirection entries for data stored in the cluster block for indirection units before the journal but after any earlier stored journal. For example, journal 502 can include indirection entries for indirection units starting at the beginning 510 of cluster block 508 until the indirection unit immediately before journal 502. Similarly, journal 504 can include indirection entries for indirection units after journal 502 and immediately before journal 504.

As shown in this example, each journal is stored at a physical location that is known deterministically from the beginning of the cluster block, based on the size of the journal. For example, each journal in FIG. 5 stores 40 indirection entries, and is stored in the next indirection unit. To ensure the journals are stored at predetermined locations, a write placement manager can be configured to store the journal immediately upon detection of a journal storage event into the next indirection unit. Additionally, each journal is tied to a specific cluster block. As such, a journal that includes indirection units for a cluster block is stored in that cluster block. This may result in journals being closed before they are full. As such, another example of a journal storage event is determining that the cluster block is nearly full (e.g., has one, or other configurable number, remaining indirection unit). As shown in FIG. 5, journal 506 is closed at the end of the cluster block having one fewer entry than journals 502 or 504. Although the example of FIG. 5 shows journals having a small number of journal entries, this is for simplicity of depiction and explanation. In various embodiments, journals having more or fewer entries may be used. For example, if a journal is sized to match a 32 KiB indirection unit, each journal entry is 32 bits, and each journal includes a 20 byte header, the journal can include approximately 8,000 journal entries before being stored to disk. Such a journaling scheme enables a single 32 KiB journal to include indirection entries for approximately 256 MiB of data.

In some embodiments, the predetermined location where a journal is to be stored on the physical media may be defective (e.g., as of media production or due to use or other factor). In some embodiment, N contiguous locations on the physical media may be predetermined for each journal, where N can be defined to be any integer. For example, a predetermined location for a journal may correspond to 2 predetermined contiguous pages on an SSD. Although this increases the amount of space on the physical media dedicated to the journals, it provides layers of redundancy to ensure the fixed-location journaling scheme can still be used if one of the predetermined locations is defective. In some embodiments, defective locations can be remapped to non-defective locations logically. For example, a map of defective blocks mapped to journal locations can be maintained and remapped during device initialization to one or more non-defective locations. This remapping can be done by the SSD firmware or at the flash device level (if supported).

In some embodiments, where the number of dies in a cluster block is equal to or greater than the number of journals used in a cluster block, each journal can be stored to a different die. For example, as shown in FIG. 5, each journal 502, 504, 506 is stored to a different die. If a physical block in the cluster block exhibits a failure only a single journal is affected. To ensure journals are staggered across different dies, each journal can include a variable number of journal entries. Because the entire physical media is journaled, the number of journal entries can be predefined so that when full each journal is stored to a different die.

In some embodiments, if the number of dies in a cluster block is equal to or greater than double the number of journals used in a cluster block, then each journal can be duplicated and stored to a different die. If any die fails, no journals will be lost, as the corresponding copy can be recovered from its location on another die. Additionally, or alternatively, redundant array of independent disks (RAID) can be used to provide additional protection to the journals. For example, RAID 5 parity can be accumulated across all journals in the cluster block and saved for recovery in the event of a read failure on a journal.

Embodiments described above assume that each indirection entry corresponds to a fixed amount of disk space such that after a particular number of entries (e.g., the size of the journal) the journal is stored at a predetermined location. However, where compression algorithms are used, each entry may not correspond to the same amount of disk space. As such, if the journal is of fixed size and it is stored when it is filled, it may not be stored at a predetermined location. In some embodiments, a variable sized journal may be used that can be stored to disk upon detection that data has been written up to a predetermined location. For example, a write placement manager can keep track of write locations and cause the journal to be written to disk at a predetermined location. The journal can be closed and written to disk at the predetermined location regardless of the size of the journal, such that it can be later recovered from the predetermined location.

In some embodiments, because each journal is stored at a predetermined location, techniques may be used to reduce the likelihood of a defect at one of these locations. For example, some SSDs may be written in a single level cell (SLC) mode, where each cell stores a single bit of data, or a higher density storage mode such as multi-level cell (MLC) mode or triple level cell (TLC) mode where two bits or three bits, respectively may be stored per cell. SLC mode enables less data to be stored than MLC or TLC mode, but that data is stored more reliably. Accordingly, in some embodiments, user data may be stored to disk in MLC or TLC mode to maximize storage density. When a journal is stored in-line with the user data as discussed herein, it can be stored in SLC mode. This reduces the likelihood of a defect at the predetermined locations where the journals are stored, making the journals more robust. For example, journals 502, 504, 506, may be written in SLC mode, while all other indirection units shown in FIG. 5 may be written in TLC mode.

Figure 6:
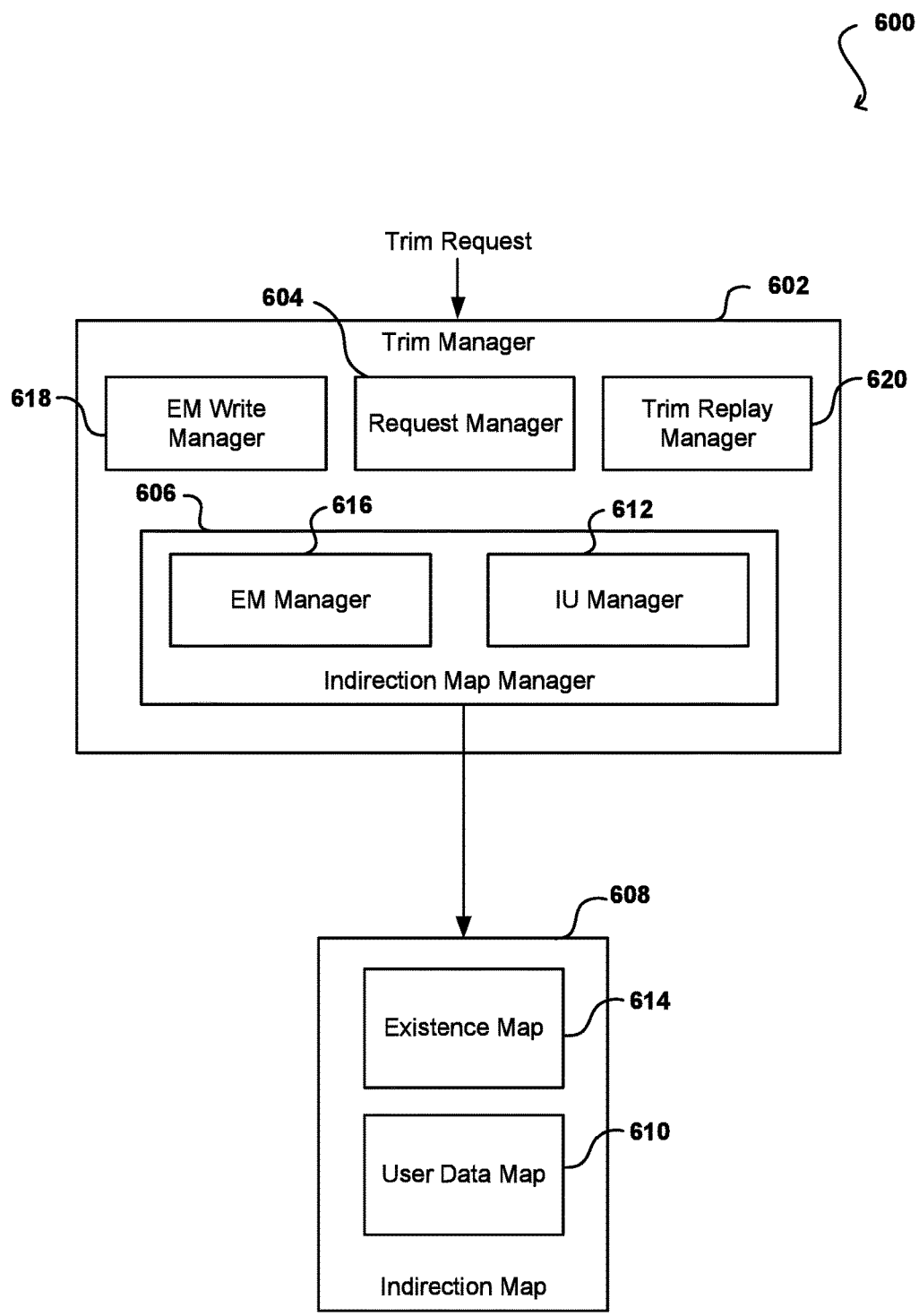
FIG. 6 illustrates a block diagram of trim manager that can be utilized in accordance with various embodiments.

FIG. 6 illustrates a block diagram 600 of a trim manager that can be utilized in accordance with various embodiments. As discussed, trim operations enable a host computer to specify one or more logical addresses, or ranges of logical addresses, as including invalid data. These specified addresses do not need to be relocated during garbage collection, reducing garbage collection overhead and write amplification, and leading to increased drive performance and longevity. In various embodiments, trim information, such as a trim value, flag, or other data indicating that the logical address is trimmed, can be included in the indirection mapping table. By including trim information in the indirection mapping table, read requests for a trimmed logical address can be responded to without reading from the physical media. Similarly, during garbage collection, trimmed indirection units can be identified from the indirection map and treated as invalid data. As such, the trimmed indirection units are not moved during garbage collection, reducing garbage collection overhead and improving drive performance.

In various embodiments, a host computer, application, service, or other entity, may know which logical addresses are in use, and which are not in use. To reduce overhead and improve performance, the host or other entity can send a trim request to a trim manager 602 to indicate logical addresses that are not, or are no longer, in use. In some embodiments, a request manager 604 can read the trim request and determine one or more logical addresses, or one or more ranges of logical addresses, to be marked as trimmed Once the logical addresses to be marked trimmed are determined, indirection map manager 606 can update indirection map 608 with trim data. As discussed, an indirection map can include entries that map logical addresses used by a host computer to physical data locations on an SSD (or other physical medium). These entries may include a user data map 610, which corresponds to data written and read by a host computer. When a user of a host computer writes data to an SSD or requests to read data from an SSD, the host computer includes a logical address that is included in the user data map 610.

When an indirection unit is trimmed, indirection unit manager 612 can update the corresponding entry for the logical address in user data map 610 to include a trim value. The trim value can indicate that the data at that logical address has been trimmed and as such can be skipped, e.g., by the garbage collector, or that all zeros can be returned, e.g., by a read manager. In some embodiments, the trim value can hold the address of an invalid physical location. For example, block 0 on any die may be reserved for system data. Accordingly, a physical address including block 0 in a user data entry can indicate that the corresponding indirection unit has been trimmed, as no user data can be stored at that physical location. Additionally, or alternatively, a flag may be added to the entry indicating that the indirection unit has been trimmed.

In some embodiments, in addition to the trim value, different fields in the indirection mapping table can be used to specify different information related to a trimmed entry. For example, the page field of a physical location can set the data to be returned when a read is attempted on a trimmed indirection unit. For example, a physical location of block 0, page 0 may cause all zeros to be returned (e.g., a read buffer may be filled with zeros and returned to the requestor). Similarly, a physical location of block 0, page 1 may cause all ones to be returned.

As discussed, spatially coupled journals are stored to predefined scattered locations on each cluster block. Each entry in the journal can include a logical block address mapped to a physical media location. In some embodiments, where no user data is stored at a particular physical location, e.g., if the location is a bad block, or if it includes system data, pad data, etc., the journal entry may include a placeholder value identifying it as corresponding to non-user data. These journals can be used to rebuild the indirection map in case of power loss. However, the journals only include information about data written to the physical media. Trim data, however, is added to the indirection map and not written to the SSD when it is received. As such, the journals do not include trim data. If the indirection map is lost, e.g., due to power failure, when it is rebuilt the trim data that it previously included will be lost.

In some embodiments, to support trim operations indirection map 608 can include an existence map 614. Existence map 614 can indicate, for each indirection unit, whether that indirection unit has been trimmed. For example, existence map 614 can be a bitmap that includes an existence bit for each indirection unit. If the existence bit is 0, then the indirection unit is trimmed, and if the existence bit is 1, the indirection unit includes user data. Existence map manager 616 can identify a bit associated with a logical block address to be trimmed, and set the existence bit to 0. To ensure that trim data can be recovered following loss of the indirection map 608, the existence map 614 can be backed up to disk. When the indirection map is rebuilt, the most recent backup of the existence map can be read from disk and used to update the existence map indirection units and to create a new existence map. In various embodiments, the most recent backup of the existence map may include a most recently stored copy of each existence map indirection unit.

In some embodiments, existence map write manager 618 can regularly store existence map 614 to disk. For example, existence map write manager 618 may include a scheduler that stores existence map 614 at a specified time and/or interval. Additionally or alternatively, existence map write manager 618 may include one or more backup rules that cause the existence map 614 to be backed-up upon detection of a storage event. For example, existence map write manager may back up existence map 614 each time a trim operation is completed. In various embodiments, existence map 614 may include one or more indirection units. For example, where existence map 614 is a bitmap and each indirection unit is 32 KB, each existence map indirection unit can include existence bits corresponding to 256,000 indirection units. Depending on the size of the drive being mapped, the existence map may be stored across one or more indirection units. As such, in various embodiments, existence map write manager may store only the portion or portions of the existence map that have changed following a trim operation. In some embodiments, when the existence map has been changed, the corresponding existence map indirection unit that has been changed can be added to a buffer. Existence map write manager 618 can monitor how many changed existence map indirection units have been added to the buffer. A storage event may be detected when the number of changed existence map indirection units exceeds a threshold number. The threshold hold number may be defined based on the amount of data that can be stored in the event of an unexpected loss of power. This way, existence map indirection units are saved even in the event of power failure.

In some embodiments, trim replay manager 620 may be implemented by trim manager 602 and/or may interface with a replay manager provided as part of another module of a controller or flash translation layer, for example, as discussed above with respect to FIG. 2. Trim replay manager 620 can rebuild the existence map following a replay event, e.g., upon boot, upon recovery from power loss, upon receiving a replay request, etc. Journals may be retrieved from their scattered predetermined locations and the entries parsed to determine if one corresponds to a trim indirection unit. If a trim indirection unit is identified (e.g., based on the range of indirection unit numbers discussed below with respect to FIG. 7), that indirection unit can be retrieved and the existence map can be updated based on the bit map contained within indirection unit. In some embodiments, during replay a new existence map can be generated with each bit set to 1. During replay, as each trim indirection unit is retrieved, any bits marked trimmed can be flipped to 0. In some embodiments, once each trim indirection unit is retrieved, the most recently stored trim indirection units can be identified, e.g., based on sequence numbers assigned to each journal. The new existence map may then be updated to match the most recently stored trim indirection units. Replay of the existence map, as may be performed by trim replay manager 620, is discussed further below with respect to FIG. 9.

Figure 7:
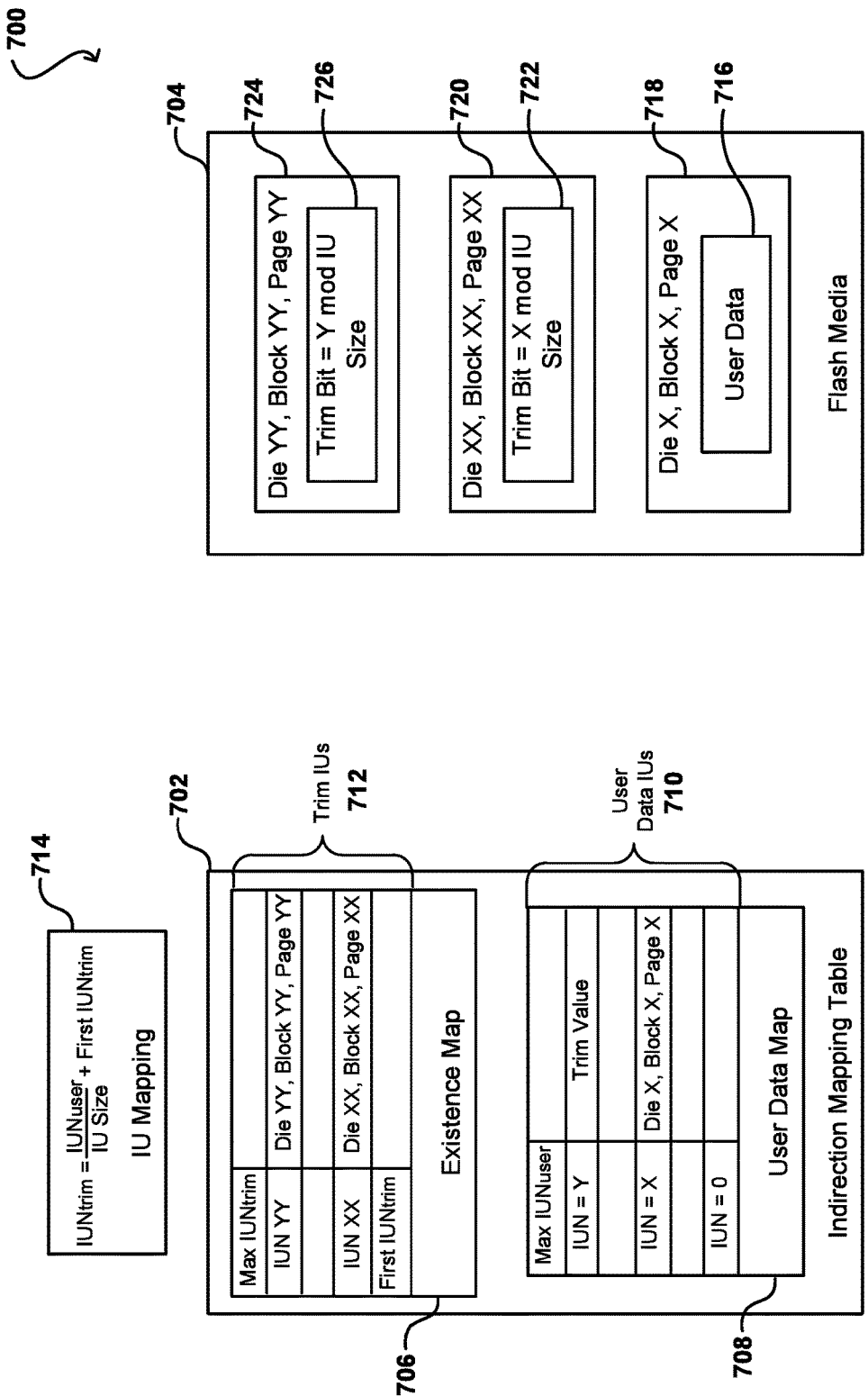
FIG. 7 illustrates an indirection mapping table including trim data in accordance with various embodiments.

FIG. 7 illustrates a diagram 700 of an indirection mapping table including trim data, in accordance with various embodiments. As shown in FIG. 7, an indirection mapping table 702 can include an existence map 706 and a user data map 708. As discussed, existence map 706 can include trim data which corresponds to user data indirection units 710 maintained in user data map 708. Existence map 706 can be divided across multiple trim indirection units 712, depending on the size of the drive and size of each indirection unit, as discussed above.

In various embodiments, existence map 706 and user data map 708 can be part of the same map or other data structure. User data map 708 can start at indirection unit 0 and increment to a maximum indirection unit number (shown in FIG. 7 as Max $IUN_{user}$). Trim indirection units 712 can start following Max $IUN_{user}$ at First $IUN_{trim}$ and increment to Max $IUN_{trim}$. In this example, each trim indirection unit includes a portion of a trim bitmap that indicates existence information for user data indirection units. For example, each trim indirection unit may include 256K bits of existence information, corresponding to 256K user data indirection units. The numbers discussed herein are provided as an example for ease of description. The number of existence bits in a given indirection unit may vary depending on the size of the indirection units used in a given implementation.

To determine which trim indirection unit includes an existence bit for a given user data indirection unit, IU Mapping equation 714 may be used. As shown, the trim indirection unit number (e.g., logical block address) is equal to the user data indirection unit number, divided by the indirection unit size (in bits), plus the First $IUN_{trim}$. For example, where the indirection unit size is 32 KB, the indirection unit size used would be 256K=262,144 bits. As such, the first 256K user data indirection units, e.g., units 0-262,143, when divided by 262,144 is less than one, rounded down and added to First $IUN_{trim}$ results in First $IUN_{trim}$. The next 262,144 user data indirection units map to First $IUN_{trim}+1$, and so on.

With the trim indirection unit identified, the existence bit for a given user data indirection unit can be identified using its indirection unit number. For example, an indirection unit's existence bit position may be calculated by taking IUN modulo Indirection Unit Size (in bits). Continuing with the example 256K bit size indirection unit discussed above, an existence bit position can be identified by calculating IUN mod 256,000. In the example of FIG. 7, IUN X maps to physical location Die X, Block X, Page X. This corresponds to user data 716 at this location 718 on flash media 704. Because this is a valid physical location for user data, this indicates that this indirection unit is not trimmed. This may be confirmed by locating IUN X's corresponding existence bit. The corresponding trim IU can be calculated as noted above, and in this example is denoted as IUN XX, corresponding to Die XX, Block XX, Page XX 720. The existence bit position 722 in this indirection unit may then be calculated as X mod 256K. Since this indirection unit is not trimmed, the existence bit is set to 1.

As shown in FIG. 7, IUN Y has been updated to a trim value. As discussed, this may be an invalid physical location (e.g., any location including Block field set to 0), a trim flag, or any other value indicating that the indirection unit has been trimmed Corresponding trim indirection unit YY maps to Die YY, Block YY, Page YY 724 and existence bit position Y mod 256K. This existence bit 726 has been set to 0 to indicate that it is trimmed.

Figure 8:
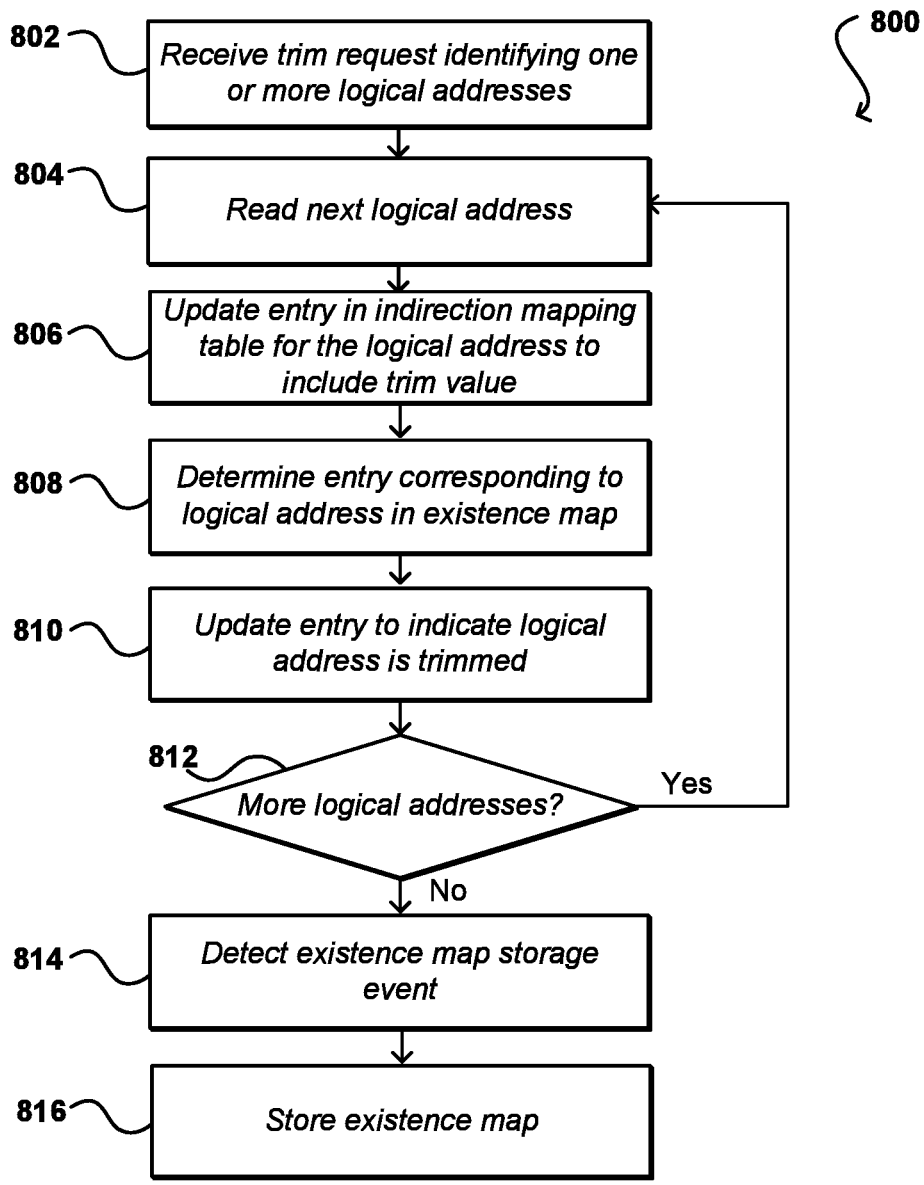
FIG. 8 illustrates a block diagram of a method of performing a trim operation that can be utilized in accordance with various embodiments.

FIG. 8 illustrates a block diagram of a method 800 of performing a trim operation that can be utilized in accordance with various embodiments. As shown in FIG. 8, a trim request can be received 802 which identifies one or more logical addresses, or one or more ranges of logical addresses to be trimmed. The indirection mapping table can include a plurality of indirection units that map physical data locations on the SSD to logical addresses used by a host computer. These may include user data indirection units and trim indirection units. The first logical address from the request can be read 804. In various embodiments, an indirection unit in the indirection mapping table associated with the first logical address can be identified. The indirection unit can be updated 806 to include a trim value indicating that the corresponding logical address has been trimmed. As discussed, the trim value may include a trim flag (e.g., a single bit added to the indirection unity), an invalid physical data location (e.g., a physical data location reserved for system data) or other value.

Once the indirection unit has been updated, a corresponding entry in an existence map can be determined 808. The existence map can be a bitmap, where each bit represents the trim status of a different user data indirection unit. For example, a single trim indirection unit may include 256 thousand bits, corresponding to 256 thousand user data indirection units. The corresponding entry can then be updated 810 to indicate that the logical address has been trimmed. It can then be determined if additional logical addresses were included 812 in the trim request. If so, processing may return to 804 and the next logical address is read. If not, the trim operation is complete. In some embodiments, following the trim operation the corresponding existence map indirection unit that has been modified by the trim operation can be added to a buffer. The existence map indirection unit can be stored following the detection 814 of an existence map storage event. For example, a storage event may be detected when the number of changed existence map indirection units exceeds a threshold number. Additionally, or alternatively, a storage event may be scheduled to occur (e.g., based on time, number of trim operations, etc.). In some embodiments, the completion of a trim operation may be a storage event, such that all or a portion of the existence map is stored following each trim operation. After the storage event has been detected, all or a portion of the existence map may be stored 816 to the SSD. In some embodiments, the entire existence map can be stored to the SSD following a trim operation. This may include a plurality of existence map indirection units. In some embodiments, a portion of the existence map that has been updated can be stored to the SSD. For example, only those existence map indirection units that have been updated by the trim operation may be stored to the SSD. As discussed, the existence map may represent a particular range of entries in the indirection mapping table. For example, the indirection mapping table may include a first range of entries corresponding to user data indirection units, and a second range of entries corresponding to existence map indirection units. In some embodiments, only the existence map, corresponding to the range of the indirection map including the existence map indirection units, is stored to disk to ensure trim data is available following a power outage or other boot event.

In some embodiments, following a trim operation, one or more indirection units that have been marked trimmed may be rewritten. Accordingly, these indirection units are no longer trimmed and their statuses need to be updated. When such an indirection unit is rewritten, the corresponding existence bit to that indirection unit can be updated to reflect that it is no longer trimmed (e.g., flipped from 0 to 1). This updated status will later be stored to disk with the updated existence map. As discussed, the updated existence map may be stored immediately following a change to the existence map, e.g., due to a trim request or a write request, or based on a backup schedule, event detection, etc.

Figure 9:
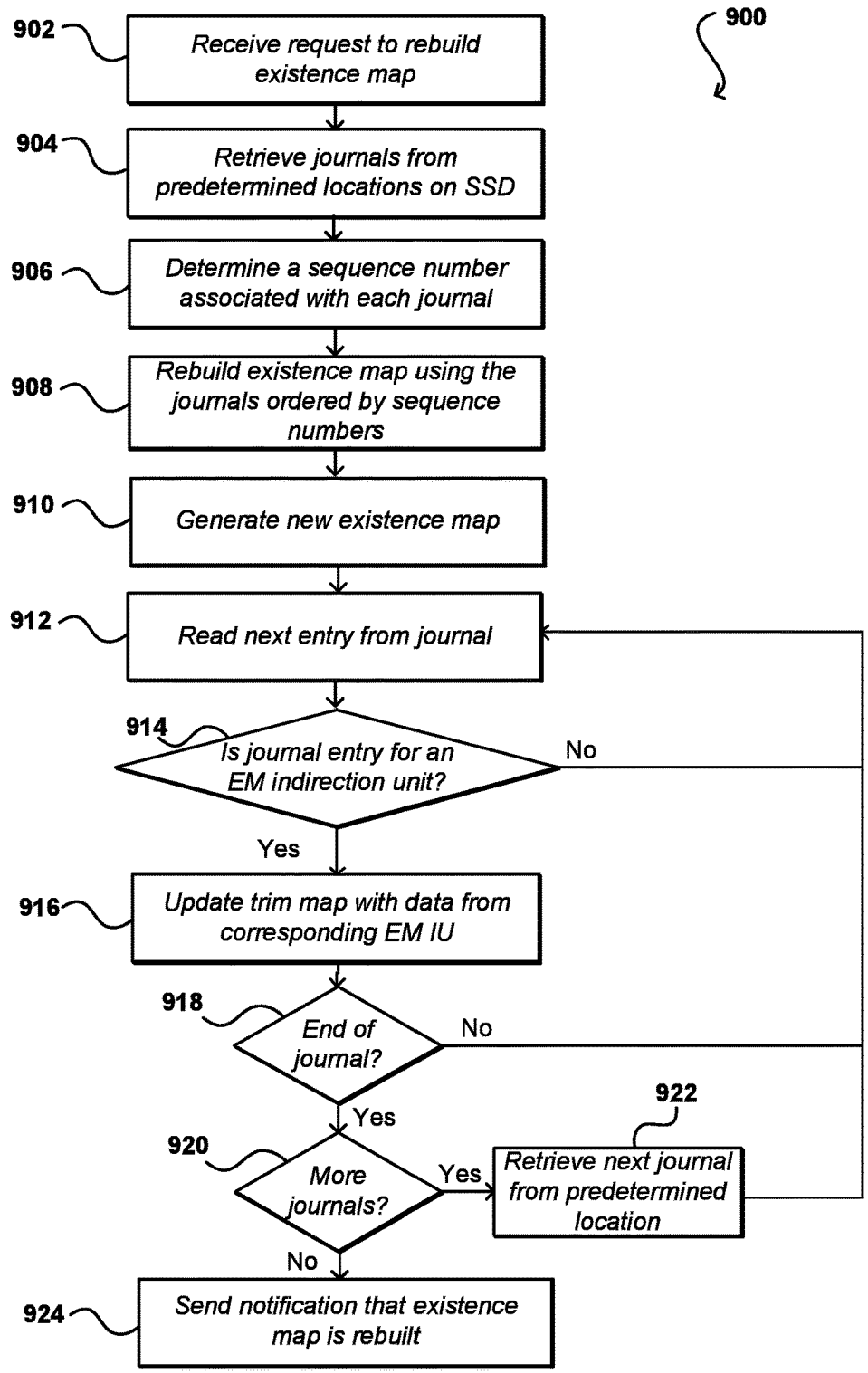
FIG. 9 illustrates a block diagram of a method of rebuilding a trim map using spatially coupled journals that can be utilized in accordance with various embodiments.

FIG. 9 illustrates a block diagram of a method 900 of rebuilding an existence map using spatially coupled journals that can be utilized in accordance with various embodiments. A request to rebuild the existence map can be received 902. In some embodiments, a replay event, such as a boot up event, a replay request, recovery from power outage, or other event, may be detected and trigger a rebuild of the existence map. Journals may be retrieved 904 from predetermined locations on the SSD. In some embodiments, a plurality of journals can be retrieved from a plurality of predetermined locations. The plurality of journals may include a first journal from each cluster block, or every journal stored on the SSD, or any other combination of multiple journals.

In some embodiments, the existence map can be rebuilt using the most recently stored existence map indirection units. Sequence numbers associated with each journal can be used to determine the order in which the existence map indirection units were stored. A sequence number associated with a cluster block can be determined from the journal 906. For example, when a first journal is retrieved from each cluster block, the sequence numbers can be used to determine the order in which the cluster blocks are processed to rebuild the indirection mapping table, including the existence map. The existence map can be rebuilt 908 using the journals ordered by sequence numbers. Rebuilding the existence map can include creating 910 a new existence map. In some embodiments, the new existence map may be initially set to indicate that all data is trimmed, no data is trimmed, or any other initial state. An entry can be read 912 from the current journal being parsed. The journal entry can be analyzed to determine 914 whether it corresponds to a trim indirection unit. If the journal entry does not correspond to a trim indirection unit, processing can return to 912 and the next journal entry can be read.

If the journal entry corresponds to a trim indirection unit, the new existence map can be updated 916 based on the trim indirection unit. In some embodiments, each trim indirection unit can be used to update the new existence map in order, to rebuild the existence map to match its last stored state. In some embodiments, once all stored trim indirection units have been retrieved, the most recently stored indirection units can be identified based on their corresponding journal sequence numbers and the new existence map can be updated using only the most recently stored trim indirection units. It can be determined whether the end of the journal has been reached 918, if not, processing may return to 912 and the next entry is read. If so, it can be determined 920 if additional journals exist. In some embodiments, this may be determined by retrieving data from predetermined locations where journals may be stored. In some embodiments, journal header data may indicate whether additional journals exist. For example, the header may include a timestamp when the journal was written which may be compared to a timestamp associated with the replay event. Additionally, or alternatively, the journal header may include a total number of journals, updated each time a new journal is stored. If additional journals exist, the next journal can be retrieved 922 from its predetermined location and the entries of the next journal can be processed as discussed above with respect to blocks 912-920. If no additional journals exist, a notification can be sent 924 indicating the existence map has been rebuilt.

In some embodiments, replay of the existence map can be performed using only the most recently stored copy of each existence map indirection unit. In some embodiments, when an existence map indirection unit is identified, the data for the indirection unit can be read and copied into the new existence map, effectively replacing that portion of the existence map with the most recently stored copy of that portion of the existence map. Alternatively, when the existence map indirection unit is identified, the bits for that portion of the existence map can be analyzed. For each bit, the corresponding user data indirection unit can be determined. If the bit indicates that the user data IU is not trimmed, then the corresponding user data IU can be ignored. If the bit indicates that the user data IU is trimmed, then the corresponding user data IU entry can be read from the indirection map. If the entry indicates that the IU is trimmed, then it can be ignored as it is already up to date. If the entry does not indicate that the IU is trimmed, then the entry can be updated to indicate that the IU is trimmed.

Figure 10:
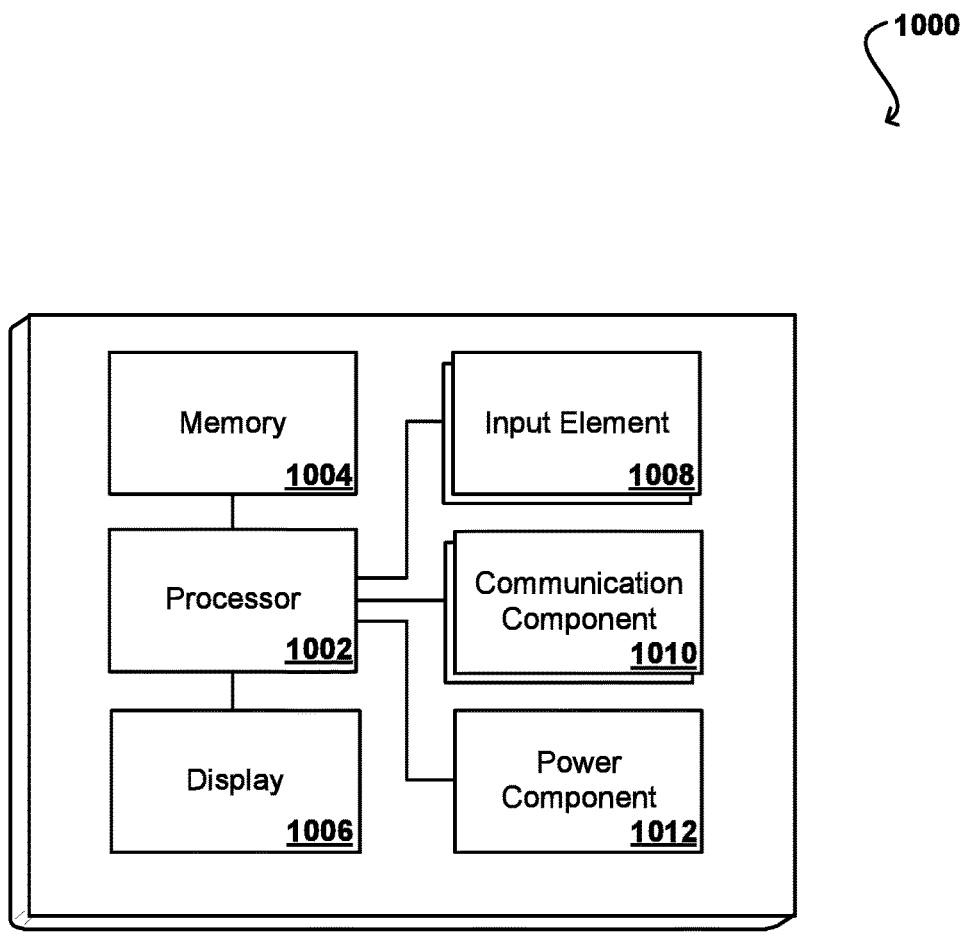
FIG. 10 illustrates components of an example computing device that can be used to perform aspects of the various embodiments.

FIG. 10 illustrates a logical arrangement of a set of general components of an example computing device that can be used to implement aspects of the various embodiments. In this example, the device includes a processor 1002 for executing instructions that can be stored in a memory device or element 1004. As would be apparent to one of ordinary skill in the art, the device can include many types of memory, data storage, or non-transitory computer-readable storage media, such as a first data storage for program instructions for execution by the processor 1002, a separate storage for images or data, a removable memory for sharing information with other devices, etc. The device may include some type of display element 1006, such as a touch screen or liquid crystal display (LCD), although devices such as portable media players might convey information via other means, such as through audio speakers. In some embodiments, the computing device 1000 can include one or more networking and/or communication elements 1008, such as a Wi-Fi, Bluetooth, RF, wired, or wireless communication system. The device in many embodiments can communicate with a network, such as the Internet, and may be able to communicate with other such devices. In some embodiments the device can include at least one additional input component 1010 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The device will also include one or more power components 1012, such as a power source, battery compartment, wireless charging circuitry, and the like, for providing and/or obtaining the power needed for the computing device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable non-transitory media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A system, comprising:
   at least one processor; and
   memory including instructions that, when executed by the at least one processor, cause the system to:
   receive a request to mark one or more logical addresses as trimmed;

update one or more entries of an indirection mapping table corresponding to the one or more logical addresses based at least in part on the request to include a trim value, the indirection mapping table mapping physical data locations on a solid state drive (SSD) to a plurality of logical addresses;

determine one or more entries of an existence map corresponding to the one or more logical addresses, the one or more entries of the existence map including header data;

update the one or more entries of the existence map to indicate the one or more logical addresses are trimmed;

store the existence map to a solid state drive (SSD), the existence map stored in a cluster block in-line with user data;

detect a replay event; and generate a new existence map based at least in part on the header data, the new existence map including a plurality of trim indirection units.

2. The system of claim 1, wherein the trim value is an invalid physical data location or a trim flag.

3. The system of claim 1, wherein the instructions when executed further cause the system to:

receive a write request;

write data to a logical address previously marked trimmed;

look up an existence bit in the existence map corresponding to the logical address; and update the existence bit to indicate that the logical address is not trimmed.

4. The system of claim 1, wherein the existence map is a bitmap including a plurality of existence bits, each existence bit corresponding to a different entry from the indirection mapping table.

5. The system of claim 1, wherein the instructions to store the existence map to the SSD when executed further cause the system to:

store a plurality of indirection units comprising the existence map to the SSD.

6. The system of claim 1, wherein the instructions to store the existence map to the SSD when executed further cause the system to:

store at least one indirection unit including an update to the existence map to the SSD.

7. The system of claim 1, wherein the instructions when executed further cause the system to:

retrieve a plurality of journals from a plurality of predetermined locations; and determine one or more trim indirection units using the plurality of journals.

8. The system of claim 1, wherein the existence map corresponds to a portion of the indirection mapping table outside of a range of entries of the indirection mapping table including the user data.

9. A computer-implemented method, comprising:

storing an indirection mapping table for a solid state drive (SSD) in memory, the indirection mapping table including an existence map and a user data map, the existence map including header data and a plurality of existence bits corresponding to a plurality of indirection units in the user data map;

receiving a trim request from a host computer, the trim request including one or more logical addresses not in use by the host computer;

for each logical address of the one or more logical addresses from the trim request looking up an indirection unit in the user data map using the logical address, updating the indirection unit to include a trim value;

determining an existence bit in the existence map corresponding to the logical address; and setting the existence bit to indicate that the logical address is trimmed;

storing the existence map to the SSD, the existence map stored in a cluster block in-line with user data and including a plurality of trim indirection units;

detecting a replay event; and generating a new existence map based at least in part on the header data, the new existence map including a plurality of trim indirection units.

10. The computer-implemented method of claim 9, further comprising:

receiving a write request including data to be written to the SSD;

writing data to a logical address previously marked trimmed;

looking up an existence bit corresponding to the logical address;

updating the existence bit to indicate that the logical address is not trimmed; and storing an updated existence map to the SSD.

11. The computer-implemented method of claim 9, wherein the trim value is an invalid physical data location or a trim flag.

12. The computer-implemented method of claim 9, further comprising:

receiving a request from the host computer to rebuild the existence map;

retrieving a plurality of journals from a plurality of predetermined locations;

determining one or more trim indirection units using the plurality of journals;

generating a new existence map, the new existence map including the plurality of existence bits set to zero; and updating the plurality of existence bits using the one or more trim indirection units.

13. A computer-implemented method, comprising:

receiving a request to mark one or more logical addresses as trimmed;

updating one or more entries of an indirection mapping table corresponding to the one or more logical addresses based at least in part on the request to include a trim value;

determining one or more entries of an existence map corresponding to the one or more logical addresses, the one or more entries of the existence map including header data;

updating the one or more entries of the existence map to indicate the one or more logical addresses are trimmed;

storing the existence map to a solid state drive (SSD), the existence map stored in a cluster block in-line with user data;

detecting a replay event; and generating a new existence map based at least in part on the header data, the new existence map including a plurality of trim indirection units.

14. The computer-implemented method of claim 13, wherein the trim value is an invalid physical data location or a trim flag.

15. The computer-implemented method of claim 13, further comprising:

receiving a write request;

writing data to a logical address previously marked trimmed;

looking up an existence bit in the existence map corresponding to the logical address; and updating the existence bit to indicate that the logical address is not trimmed.

16. The computer-implemented method of claim 13, wherein the existence map is a bitmap including a plurality of existence bits, each existence bit corresponding to a different entry from the indirection mapping table.

17. The computer-implemented method of claim 13, wherein storing the existence map to the SSD further comprises:

storing a plurality of indirection units comprising the existence map to the SSD.

18. The computer-implemented method of claim 13, wherein storing the existence map to the SSD further comprises:

storing at least one indirection unit including an update to the existence map to the SSD.

19. The computer-implemented method of claim 13, further comprising:

retrieving a plurality of journals from a plurality of predetermined locations; and determining one or more trim indirection units using the plurality of journals.

20. The computer-implemented method of claim 13, wherein the existence map corresponds to a portion of the indirection mapping table outside of a range of entries of the indirection mapping table including the user data.

\* \* \* \* \*